(12) United States Patent
Verechtchiagine

(10) Patent No.: US 7,973,707 B2
(45) Date of Patent: Jul. 5, 2011

(54) METHOD FOR GEOFENCING

(75) Inventor: Dmitri Verechtchiagine, Nepean (CA)

(73) Assignee: 2201028 Ontario Inc., Ottawa, Ontario (CA)

( * ) Notice: Subject to any disclaimer, the term of this patent is extended or adjusted under 35 U.S.C. 154(b) by 427 days.

(21) Appl. No.: 12/136,996

(22) Filed: Jun. 11, 2008

(65) Prior Publication Data

US 2009/0309789 A1    Dec. 17, 2009

(51) Int. Cl.
  *G01S 19/50* (2010.01)
  *G01S 19/51* (2010.01)
  *G08B 23/00* (2006.01)

(52) U.S. Cl. .......... 342/357.33; 342/357.34; 340/573.3; 340/573.4

(58) Field of Classification Search .............. 342/357.33, 342/357.34; 340/573.3, 573.4, 825.49
See application file for complete search history.

(56) References Cited

U.S. PATENT DOCUMENTS

| | | | |
|---|---|---|---|
| 3,384,891 A | 5/1968 | Anderson | |
| 5,452,211 A | 9/1995 | Kyrtsos et al. | |
| 5,867,122 A | 2/1999 | Zahm et al. | |
| 5,977,909 A | 11/1999 | Harrison et al. | |
| 7,002,573 B2 * | 2/2006 | Trotta et al. | 345/420 |
| 2004/0039527 A1 * | 2/2004 | McDonald et al. | 342/357.07 |
| 2005/0159883 A1 * | 7/2005 | Humphries et al. | 701/207 |
| 2005/0203683 A1 * | 9/2005 | Olsen et al. | 701/35 |
| 2005/0205719 A1 * | 9/2005 | Hendrickson et al. | 246/122 R |
| 2006/0100777 A1 * | 5/2006 | Staton et al. | 701/200 |
| 2009/0231192 A1 * | 9/2009 | van Diggelen et al. | 342/357.15 |
| 2010/0127919 A1 * | 5/2010 | Curran et al. | 342/357.07 |

* cited by examiner

*Primary Examiner* — Thomas H Tarcza
*Assistant Examiner* — Fred H Mull
(74) *Attorney, Agent, or Firm* — Marks & Clerk

(57) ABSTRACT

A method for determining that a GPS receiver is located within a predetermined geofence volume. An embodiment of the invention includes the steps of receiving global positioning system signals from a plurality of GPS satellites; calculating a solution set of possible receiver positions from the global positioning signals; determining whether any portion of the solution set of receiver positions is within the geofence volume; and determining that the receiver is outside the geofence volume if no portion of the solution set of receiver positions is within the geofence volume. The concept of exclusion space is introduced and used in methods for determining the probability that a receiver is within a geofence volume.

12 Claims, 12 Drawing Sheets

METHOD FOR GEOFENCING

BACKGROUND OF THE INVENTION

1. Field of Invention

The present invention relates to an improved method for determining whether a Global Positioning System (GPS) receiver is located within a predetermined distance from a base point.

2. Background

2D Fix and Three Satellite Fix Geofencing Problem

Geofencing is determining the position of an object relative to a base position. A boundary located a predetermined distance away from the base position is a geofence, and the object being tracked is either inside, directly on, or outside the geofence boundary. One way to perform geofencing is to attach a GPS receiver to the object to be tracked and use GPS data from the receiver to determine where the object is relative to the geofence.

A standard GPS fix requires signals from at least four satellites, however, the use of a three satellite GPS fix is a common practice in commercial GPS receivers. The reason for the use of a three satellite fix is the desire to increase GPS fix availability, frequently impeded by partial satellite view blockages. Though the three satellite fix increases fix availability, it has a serious drawback: the position obtained from a three satellite fix has, generally unpredictable, and often large, horizontal position errors. That makes the standard three satellite fix, where the output is a point position, especially unsuitable for geofence applications.

In co-pending U.S. patent application Ser. No. 11/692,665 filed Mar. 28, 2007, it was shown that the general solution of the two satellite fix problem is a surface. All references cited herein are incorporated by reference. Similarly, the solution of the three satellite fix problem is a curved line. The line can be approximated as a straight line in an area the size much smaller than a distance to a GPS satellite. This line is called a solution line.

Normally, a commercial GPS receiver reports the user position as a point (in Lat/Lon/Alt or XYZ coordinates). Since the solution of the three satellite fix is a line, it is necessary to have an additional constraint to obtain a position point.

A commonly used prior art constraint is the assumption of fixed altitude, where the altitude is, normally, taken from a previous (four satellite) GPS fix. With this constraint, the position point is computed as the intersection of the solution line with the locally horizontal plane lying at fixed altitude.

The goal of a geofence application, on the other hand, is not to find a position point, but, rather, to report whether a GPS receiver is inside or outside the user specified geofence volume. In the case of a four satellite GPS fix, one can always tell whether the GPS receiver is inside or outside the volume by comparing the position point coordinates with the coordinates of the geofence volume. In the case of a three satellite fix, there is a solution line instead of a point. With the solution line there can be the following two cases:

a) The solution line bypasses the geofence volume. In this case the GPS receiver is surely outside the geofence volume, or a geofence alarm is not present.

b) The solution line penetrates the geofence volume. In this case, it is not known whether the GPS receiver is inside or outside the geofence volume.

A method is therefore desired to determine whether an object falls into case a or b and if in case b, to further refine the solution to determine a probability that the object is inside or outside the geofence volume.

BRIEF SUMMARY OF THE INVENTION

An object of the present invention is to provide an improved method for determining that a GPS receiver is located within a predetermined geofence volume. An embodiment of the invention includes the steps of receiving global positioning system signals from a plurality of GPS satellites; calculating a solution set of possible receiver positions from the global positioning signals; determining whether any portion of the solution set of receiver positions is within the geofence volume; and determining that the receiver is outside the geofence volume if no portion of the solution set of receiver positions is within the geofence volume.

In a further embodiment, the method is applied in the case where only two GPS satellite signals are available and the solution set is a plane.

In a further embodiment, the method is applied in the case where only three GPS satellite signals are available and the solution set is a line.

In a further embodiment, exclusion spaces are established in which there is a high probability that the receiver cannot be located. The receiver is determined to be in the geofence volume if a portion of the solution set is within the geofence volume and the only portion of the solution set that is not within the geofence volume is within the exclusion spaces.

In a further embodiment, the probability that the receiver is within the geofence volume is calculated for the case where portions of the solution set are within the geofence volume, portions of the solution set are within the exclusion spaces and not within the geofence volume and portions of the solution set are not within either the geofence volume or the exclusion spaces. The probability that the receiver is within the geofence volume is determined by comparing the size of the portion of the solution set that is within the geofence volume with the size of the portion of the solution set that is not within either the geofence volume or the exclusion spaces.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
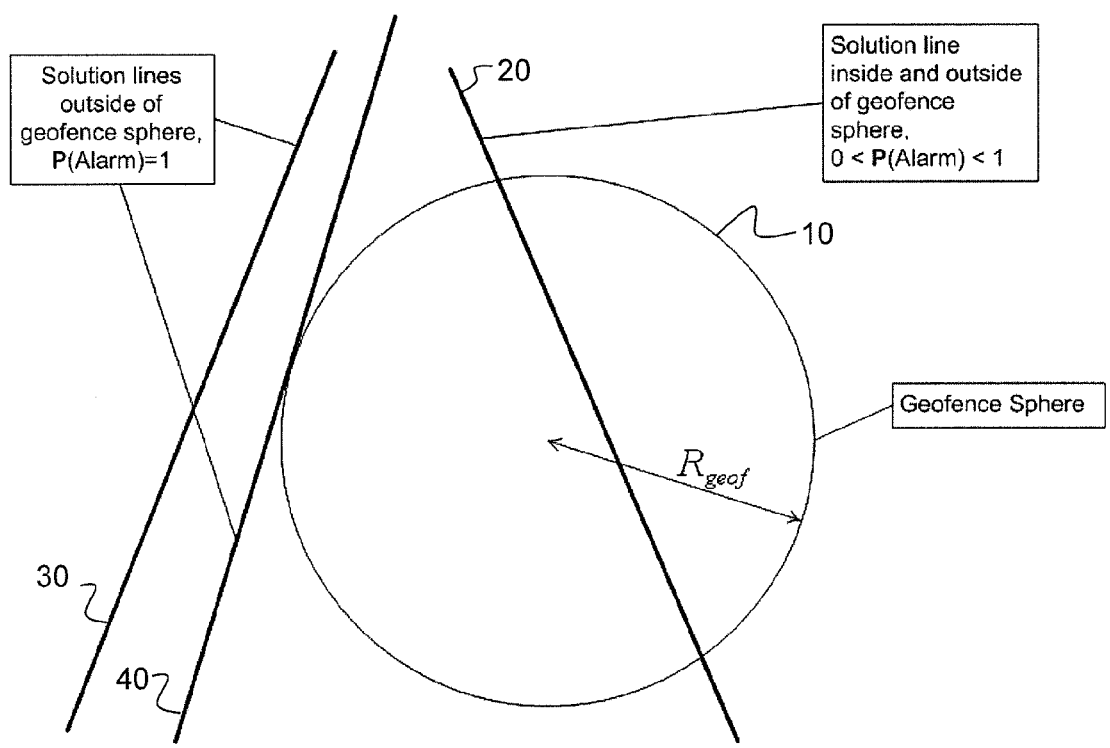
FIG. 1 is a diagram of three solution lines relative to a geofence sphere.

The following description of the invention makes reference to the following terms:

Term Definitions:

Solution Line—The line of possible user positions obtained in a three satellite GPS fix. It is different from the horizontal solution line referred to in co-pending application Ser. No. 11/692,665 defined therein as the intersection of the solution plane obtained in a two satellite fix with a receiver's position constraining plane.

2D Fix—the industry standard concept, that is, the computation of the point position formed by a solution line and a locally horizontal plane.

Geofence Volume—A user defined closed 3D area in which a GPS receiver has to be inside in order not to cause a geofence alarm.

User Position Exclusion Space or Exclusion Space—The three dimensional area in which a receiver can not reside. Exclusion spaces are defined based on supplementary information, e.g., some minimal local terrain's altitude information in combination with the assumption that the receiver is mounted on a surface based vehicle.

Open Space—The space not occupied by a geofence volume or exclusion spaces.

Horizontal Exclusion Space—The simplest form of horizontal exclusion space is the space (or half space) above or below a locally horizontal plane. Any exclusion space completely encompassed by the simplest horizontal exclusion space is also horizontal exclusion space.

Vertical Exclusion Space—The simplest form of vertical exclusion space is half space formed by a locally vertical plane splitting space into two halves. Exclusion space that can be completely encompassed by the simplest vertical exclusion space is also vertical exclusion space.

Geofence Cylinder—The cylindrical geofence volume with the axis line going through the base location and perpendicular to the locally horizontal plane.

Geofence Sphere—The spherical geofence volume with the centre in the base location.

Route Adherence Pipe or Adherence Pipe—The geofence volume in the form of a pipe with the receiver's prescribed route as the axis.

Route Adherence Corridor or Adherence Corridor—The geofence volume formed by vertical surfaces between which the receiver's prescribed route lies.

$\rho_i$ The pseudorange to the ith satellite.

$b_U$ The clock bias of the receiver clock.

$\vec{x}_b$ The base position.

$\vec{x}_U$ The user's position vector.

$\vec{r}_{B,i}$ The range vector from the base position to the i-th satellite (is this correct ?)

$\vec{1}_B$ The line-of-sight vector from the base position to the i-th satellite position.

$\vec{\delta}_U = \vec{x}_U - \vec{x}_B$ The displacement vector from the base position to the current user position.

$x_B$ The base user position. In the locally horizontal coordinate system it is the center (or 0-coordinate) of the system.

$x_U$ The user position on a solution line.

$x_U^{min}$ The point on the solution line closest to base position $x_B$.

$\delta = x - x_B$ The displacement from base position $x_B$.

$\delta_U = x_U - x_B$ The displacement vector pointing to a point on a solution line.

$\delta_U^{min} = x_U^{min} - x_B$ The displacement vector pointing from $x_B$ to $x_U^{min}$.

$l_{B,i} = (l_{B,ix}, l_{B,iy}, l_{B,iz})^T$ The line of sight vector at base location $x_B$ for the i-th satellite.

L The line of sight matrix for 3 satellites computed at $x_B$.

$M = (LL^T)^{-1}$ The inverse of the symmetric product of matrix L.

P(Alarm) The probability of a geofence alarm, i.e. probability of a monitored object being outside of the geofence area.

$P_{max\,L}$(Alarm) The probability measure of a geofence alarm based on maximum length L of the solution line interval bound by the geofence volume.

$P_{max\,S}$(Alarm) The probability measure of a geofence alarm based on maximum area S of the piece of the solution plane bound by the geofence volume.

$\Delta_{\rho-r,i} = \rho_i - r_{B,i}$ The difference between the pseudorange at the current location and the true range at the base location for the i-th satellite.

$\epsilon_{SL}$ The elevation angle of the three satellite fix solution line in the user coordinate frame.

$\alpha_{SL}$ The azimuth angle of the three satellite fix solution line in the user coordinate frame.

$e_{\Delta H}$ The horizontal error per 1 meter of altitude error in 2D Fix $D_{upper}$ The distance between the locally horizontal plane containing $x_B$ and the upper exclusion space.

$D_{lower}$ The distance between the locally horizontal plane containing $x_B$ and the lower exclusion space.

$x_{2D,H(x_0)}$ Computed in a 2D fix user position constrained with the locally horizontal plane with the altitude of position $x_0$.

Three Satellite Geofence Method Using Exclusion Spaces

FIG. 1 illustrates three different cases of where a solution line can lie with respect to a geofence sphere 10 with a radius $R_{geof}$. Solution line 20 passes thorough the sphere 10. In this case, there is a possibility that the GPS receiver is inside or outside the geofence. The probability that the receiver is outside the geofence is expressed: 0<P(alarm)<1. Solution line 30 is completely outside the geofence sphere 10. In this case, P(alarm)=1. Likewise, Solution line 40, which is outside the geofence sphere, except for one point that touches the sphere has a P(alarm)=1. Any position not within the sphere is defined to be an alarm position, including a position exactly on the sphere.

Figure 2:
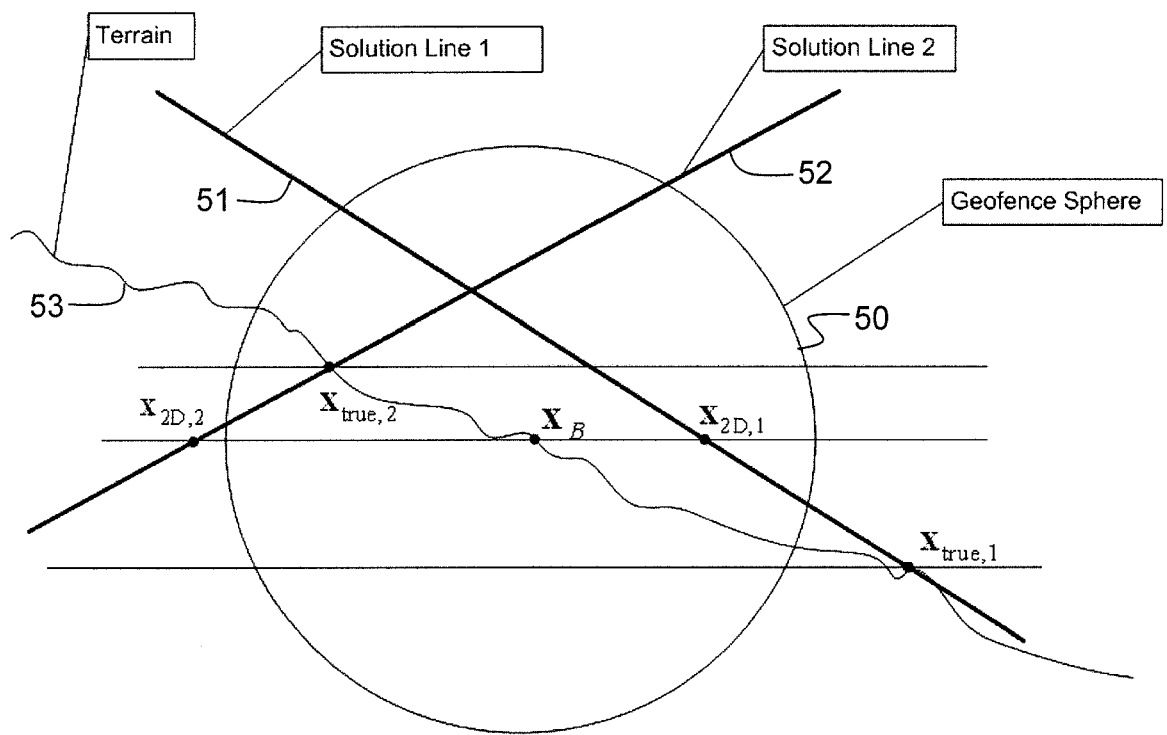
FIG. 2 is a diagram of two solution lines relative to a geofence sphere and a terrain profile.

FIG. 2 illustrates the solution lines for two instances of a three satellite GPS fix, geofence sphere 50 with the centre in base location $x_B$, true positions at the time of two GPS fixes $x_{true,1}$, $x_{true,2}$ and positions computed in these 2D fixes $x_{2D,1}$ $x_{2D,2}$, based on solutions lines 51 and 52 respectively. Positions $x_{2D,1}$, $x_{2D,2}$ were calculated by determining the intersection of the solution lines 51 and 52 with the horizontal line through the center $x_B$ of the geofence sphere 50. Note that the true positions $x_{true,1}$, $x_{true,2}$ are the intersection of the true terrain profile 53 and the solution lines 51 and 52, respectively.

The combination of terrain and solution lines in FIG. 2 is such that the attempt to use positions $x_{2D,1}$ $x_{2D,2}$ to determine whether we are outside or inside of the geofence volume would yield incorrect information. For the first 2D fix, the computed position $x_{2D,1}$ lies inside the geofence sphere, while the true position $x_{true,1}$ is outside the sphere. It means that the geofence alarm will not be generated when it should be: a missed alarm. For the second 2D fix, position $x_{2D,2}$ lies outside the geofence sphere, while $x_{true,2}$ lies inside: a false alarm.

The above example shows that the application of a standard 2D fix to geofencing may result in false and missed alarms. On the other hand, if we use the solution line geofence volume intersection method, we'll find that in both cases of the above example the solution lines 51, 52 cross the sphere 50. We cannot tell whether the receiver is outside or inside the sphere, or 0<P(Alarm)<1. This outcome is probably better than the erroneous P(Alarm)=0 or P(Alarm)=1 outcomes computed by the 2D fix method in this example.

One can reduce the number of 0<P(Alarm)<1 outcomes, transforming some of them into P(Alarm)=0 and P(Alarm)=1 outcomes, by introducing user position exclusion spaces. An exclusion space is the space where the receiver can not possibly reside. Exclusion spaces truncate the solution line, transforming it into an interval. This interval can completely reside inside a geofence volume, making possible P(Alarm)=0 outcomes for solution lines having of 0<P(Alarm)<1 outcomes. This is not possible without exclusion spaces.

Figure 3:
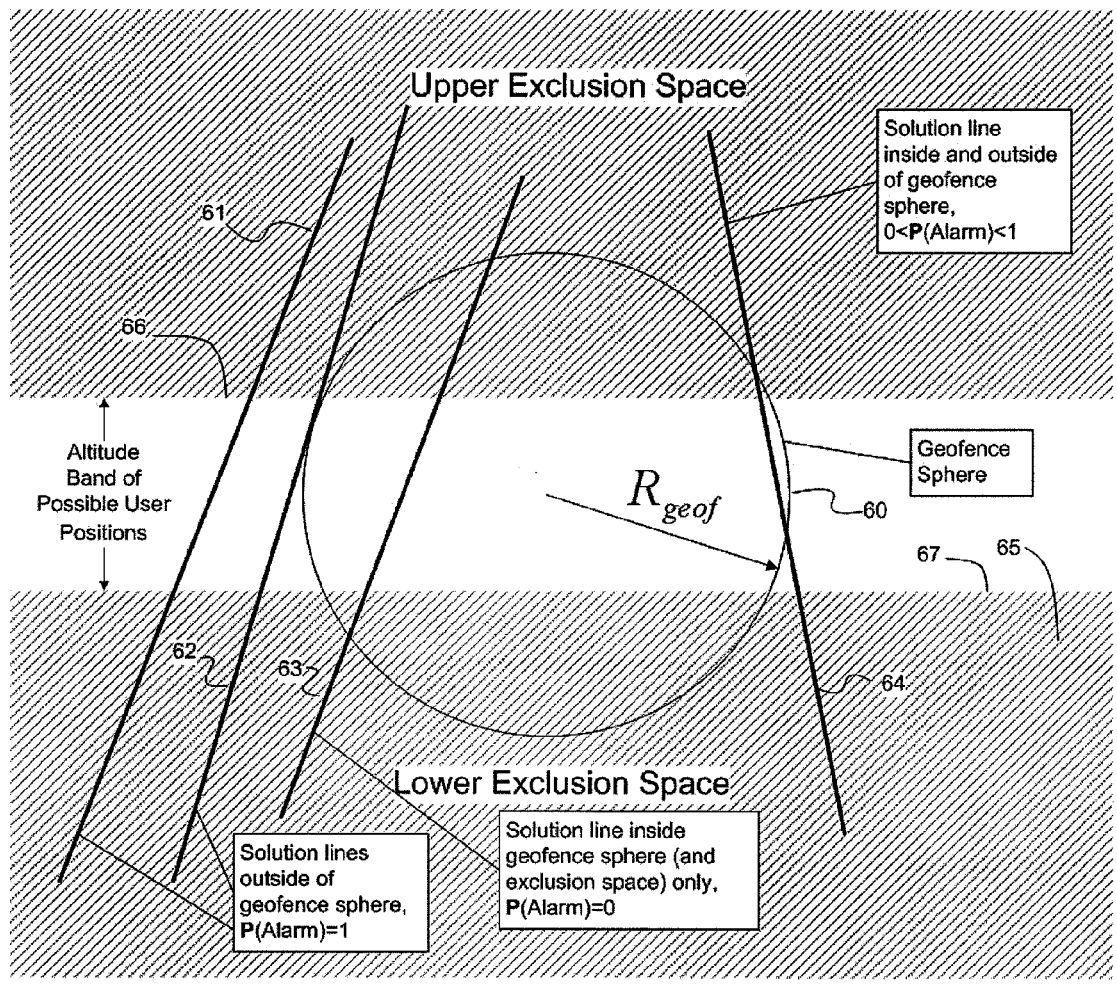
FIG. 3 is a diagram of four solution lines relative to a geofence sphere and exclusion spaces.

FIG. 3 depicts the case of solution lines 61-63 and the geofence sphere 60 with imposed exclusion spaces 64, 65. The exclusion spaces are the spaces above the specified maximum 66 and below the specified minimum 67 altitude. These altitudes 66, 67, may be known from previously recorded GPS or non-GPS positioning data.

There are three possible cases: 1) The solution interval formed by the solution line 61 or 62 and the volume not found in the exclusion spaces 64, 65 is outside the geofence sphere 60. In this case, P(Alarm)=1. 2) The solution interval formed by the intersection of the solution line 64 and the volume not found in the exclusion spaces 64, 65 is both inside and outside the geofence sphere, 0<P(Alarm)<1. 3) The solution interval solution interval formed by the intersection of the solution line 63 and the volume not found in the exclusion spaces 64, 65 is completely inside the geofence sphere, P(Alarm)=0.

Other geofence volumes can be used instead of a sphere. Another practical geofence volume is a cylinder. The case is illustrated on FIG. 4. In this example P(Alarm)=1 where the solution line 71 is outside the geofence cylinder 70. P(Alarm)=0 if the solution lines 72, 73 are inside the cylinder 70 and exclusion spaces 75, 76. Where the intersection of the solution line 74 and the volume not bounded by the exclusion spaces 75, 76 goes through the cylinder 70 and area outside the cylinder, 0<P(Alarm)<1

Figure 4:
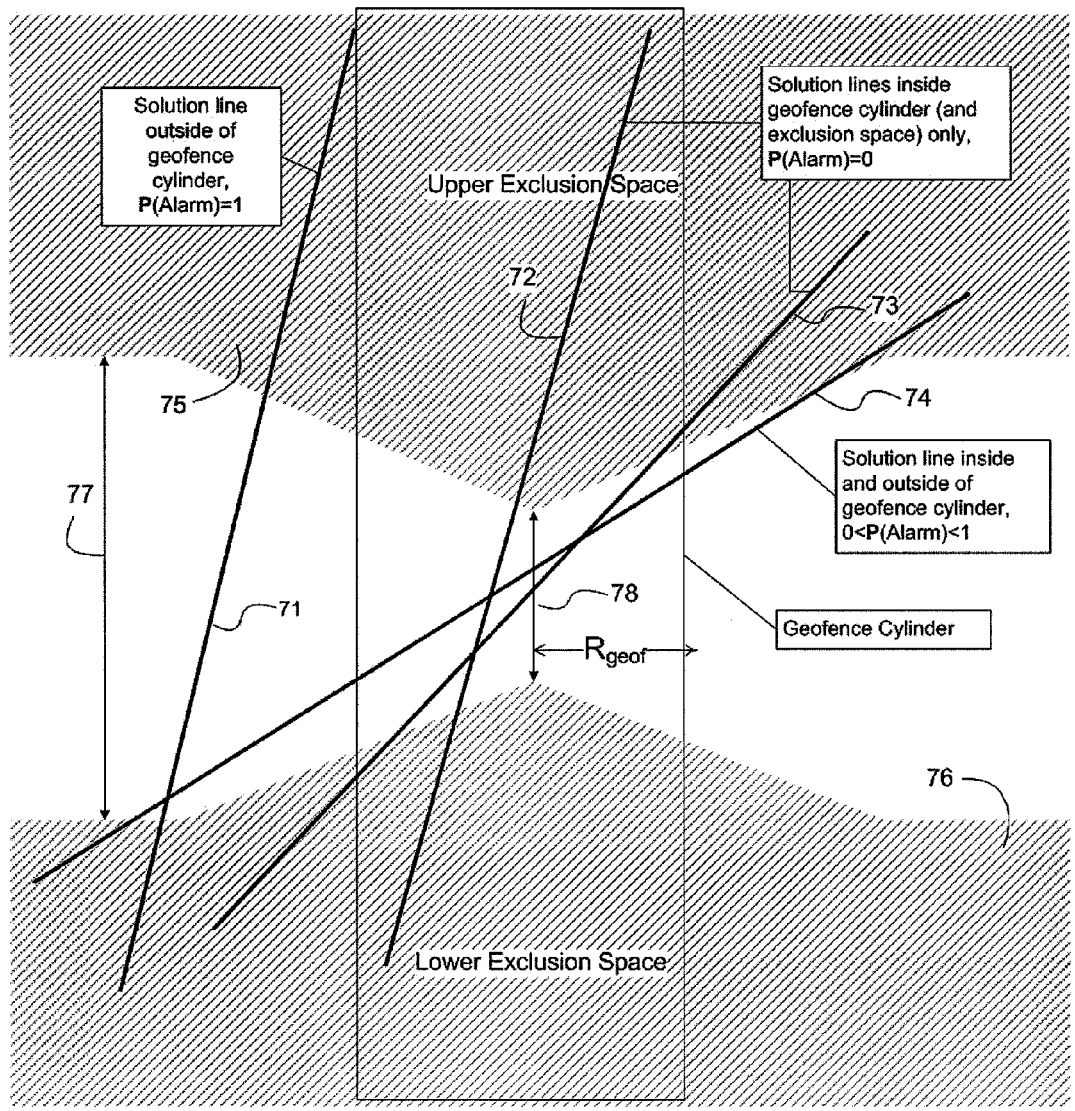
FIG. 4 is a diagram of four solution lines relative to a geofence cylinder and exclusion spaces.
Figure 5:
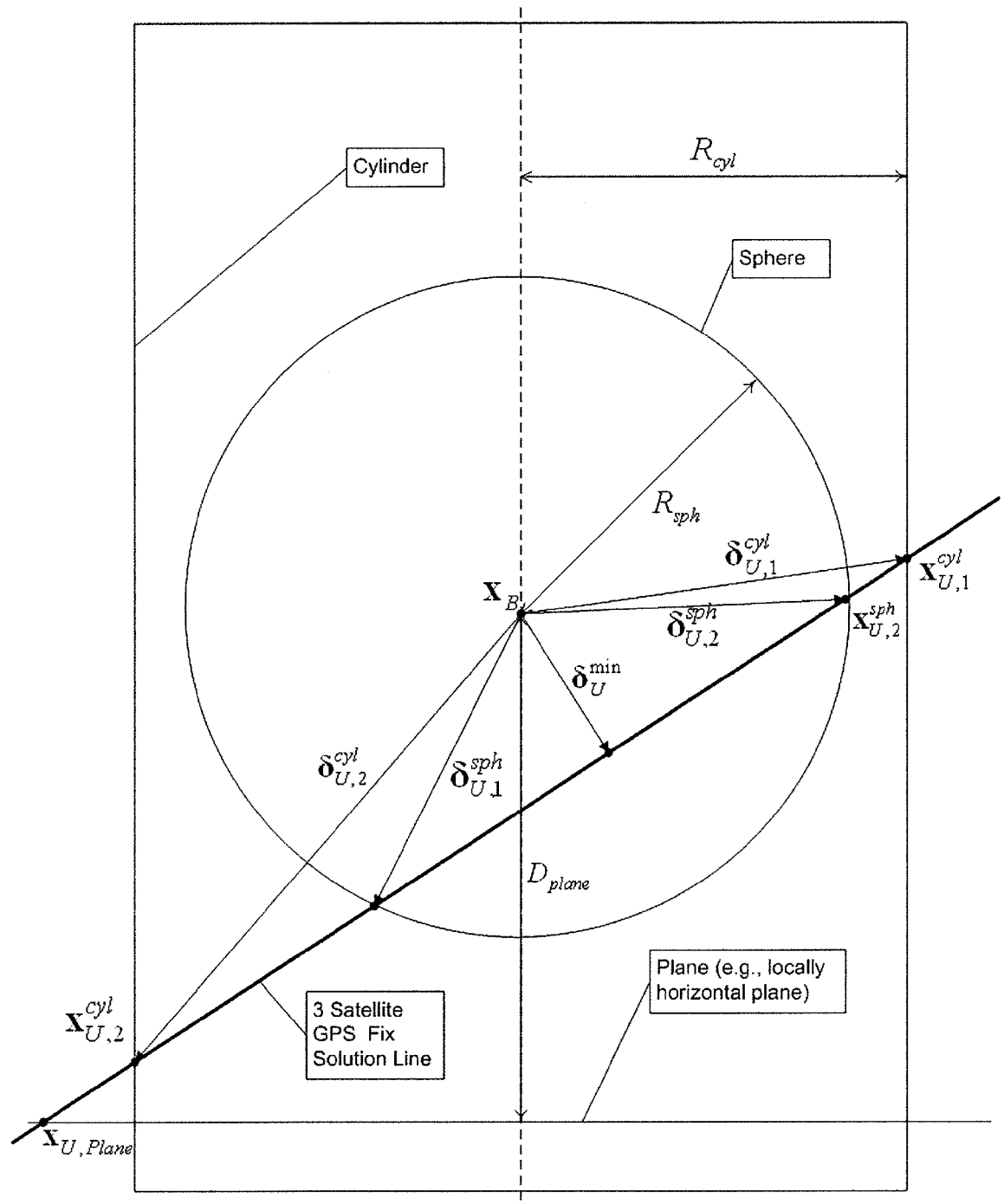
FIG. 5 is a diagram of intersection points and distances for a geofence sphere and a cylinder.

FIG. 4 also shows a potentially useful type of an exclusion space 75, 76. Geometrically this type of exclusion space can be constructed by gluing half space with a cone. These spaces allow the minimum altitude band 76 near the base position and the altitude band increasing (up to a maximum 77) with the increase of the horizontal distance from the base position. In comparison with simple exclusion spaces, selecting this type of exclusion space can have the following advantages: Reduction of the percentage of 0<P(Alarm)<1 outcomes compared with simple half space exclusion spaces; potentially better approximation of real terrain; and modeling increased altitude uncertainty farther from known altitude centre.

Combining Various Geofence Volumes and Exclusion Spaces

A large variety of geofence volume types and exclusion space types can be combined to suit the application and terrain. The border surface of an arbitrary exclusion space can be defined in a parameterized form, i.e., for a given latitude and longitude the altitude of the exclusion space surface point can be found as the interpolation of the nearest altitude points taken from the database of altitudes of the surrounding area. One of the methods to approximate an arbitrary surface is to fit the surface with a set of triangles, forming a triangulated irregular network. This technique is well known in the art. See, for example, U.S. Pat. No. 7,002,573 to Trotta et al., "Method and System for converting Engineering Data into 3D Modeling Data."

Vertical Exclusion Spaces

In the two satellite case (discussed in copending application Ser. No. 11/692,665) the set of possible user positions is determined by a solution plane rather than a solution line. A solution plane cannot be bound with horizontal exclusion spaces only. Even with horizontal exclusion spaces there will be only two outcomes P(Alarm)=1 and 0<P(Alarm)<1. By introducing vertical exclusion spaces, intersecting a geofence volume from at least two sides, one can create a subset of solution planes such that a solution plane from the subset will completely lay inside the geofence volume and vertical and horizontal exclusion spaces. In that case the geofence computation outcome will be P(Alarm)=0.

The case of the receiver object with movement restricted by two parallel walls serves as the example of the vertical exclusion spaces occurrence.

Probability of Alarm Measure Definitions

In the case of the solution line bound by exclusion spaces, let $$P(\text{Alarm}) = \frac{L_{bound} - L_{geof\ vol}}{L_{bound}} \qquad \text{Eq. 1}$$

where $L_{bound}$ is the length of the solution line bound by the exclusion spaces, $L_{goef\ vol}$ is the length of the solution line bound by a geofence volume.

In the case of the two satellite fix with the solution plane bound by vertical and horizontal exclusion spaces, let $$P(\text{Alarm}) = \frac{S_{bound} - S_{geof\ vol}}{S_{bound}} \qquad \text{Eq. 2}$$

where $S_{bound}$ is the area of the solution plane bound by the exclusion spaces, $S_{goef\ vol}$ is the area of the solution plane bound by a geofence volume.

In the case of no exclusion spaces, let $$P_{max\ L}(\text{Alarm}) = \frac{L_{bound} - L_{bound}^{max}}{L_{bound}^{max}} \qquad \text{Eq. 3}$$

and $$P_{max\ S}(\text{Alarm}) = \frac{S_{bound} - S_{bound}^{max}}{S_{bound}^{max}} \qquad \text{Eq. 4}$$

where $L_{bound}^{max}$ is the maximum possible length of the solution line's interval inside the geofence volume and $S_{bound}^{max}$ is the maximum area of the solution plane's section inside the geofence volume.

It is desirable to select exclusion spaces of the maximum possible size, leaving as little open space as possible. That will reduce the number of 0<P(Alarm)<1 outcomes.

In the extreme case of a monitored object constrained to a plane (instead of a 3D area), the percentage of 0<P(Alarm)<1 outcomes will be 0. That is the equivalent of applying the 2D fix to geofencing. The industry standard 2D fix is the intersection of the solution line with a plane of known altitude. If it is possible to restrict the receiver to a plane and the altitude of the plane is known, then position is known. If position is known then P(alarm) must be either 0 or 1. Outcomes were 0<P(Alarm)<1 are possible when it is not possible to restrict the receiver to a plane in a three-satellite situation.

Geofence Problem with Negligible Geofence Radius

The discussion above assumes that geofence radius $R_{geof}$ is significantly greater than average horizontal position error $e_{hz}^{mean}$ which is the mean value of horizontal errors caused by standard GPS signal error sources (pseudorange and orbital parameter errors). In geofence applications where a monitored object is not allowed to move at all, $R_{geof}$=0. Then the geofence problem becomes the problem of finding position $x_{2\ D,H(x_B)}$ by the 2D fix computation at the altitude of base position $x_B$ and comparing the distance between $x_{2\ D,H(x_B)}$ and $x_B$ with $e_{hz}^{mean}$ taking into account the 2D Horizontal Dilution of Precision (HDOP). This can be described by the following inequality:

$$D_{2D,B} = |x_{2D,H(x_B)} - x_B| < FH_{horz,2D} e_{hz}^{mean} \qquad \text{Eq. 5}$$

where $H_{horz,2D}$ is the HDOP equivalent for the 2D fix and F is a reliability factor. If the inequality holds, we declare P(Alarm)=0, otherwise, we declare P(Alarm)=1.

Calculating Point Coordinates and Distances of Interest

Calculation of point coordinates and distances for the use in the three satellite GPS fix geofence algorithms are provided below.

These calculations are based on the set of equations obtained in patent application (1)

$$\rho_i = r_{i,B} + \vec{\delta}_U \vec{l}_{i,B} + b_U, \ i=1,2,3 \qquad \text{Eq. 6}$$

or, using bold letters for vector notation $$\rho_i = r_{B,i} + \delta_U l_{B,i} + b_U \qquad \text{Eq. 7}$$

We can rewrite Eq. 7 as $$\delta_U l_{B,i} = \rho_i - r_{B,i} - b_U = \Delta_{\rho-r,i} - b_U \ i=1,2,3 \qquad \text{Eq. 8}$$

In Cartesian coordinates we can write a matrix equation $$L\delta_U = \Delta_{\rho-r} - b_U 1 \qquad \text{Eq. 9}$$

where $$L = \begin{pmatrix} l_{B,1x} & l_{B,1y} & l_{B,1z} \\ l_{B,2x} & l_{B,2y} & l_{B,2z} \\ l_{B,3x} & l_{B,3y} & l_{B,3z} \end{pmatrix} \qquad \text{Eq. 10}$$

is the matrix with the rows containing line-of-sight vectors for 3 satellites;

$$\delta_U = \begin{pmatrix} \delta_{U,x} \\ \delta_{U,y} \\ \delta_{U,z} \end{pmatrix} \qquad \text{Eq. 11}$$

is the displacement vector from the base position;

$$\Delta_{\rho-r} = \begin{pmatrix} \Delta_{\rho-r,1} \\ \Delta_{\rho-r,2} \\ \Delta_{\rho-r,3} \end{pmatrix} \qquad \text{Eq. 12}$$

is the vector of pseudorange/range differences for 3 satellites;

$$1 = \begin{pmatrix} 1 \\ 1 \\ 1 \end{pmatrix} \qquad \text{Eq. 13}$$

is the vector of ones.

Solving Eq. 8 for δ we obtain:

$$\delta_U = L^{-1}\Delta_{\rho-r} - b_U L^{-1} 1 \qquad \text{Eq. 14}$$

and $$x_U = x_B + L^{-1}\Delta_{\rho-r} - b_U L^{-1} 1 \qquad \text{Eq. 15}$$

Equation 15 represents the equation of a straight line in 3D space in the parametric form with $b_U$ serving as the line's parameter.

Finding Minimum Distance from the Base Location to the Solution Line

The distance from the base position to the solution line is the minimum value of $$|\delta_U| = \sqrt{\delta_U^T \delta_U} \qquad \text{Eq. 16}$$

where $$\delta_U^T \delta_U = (L^{-1}\Delta_{\rho-r})^T L^{-1}\Delta_{\rho-r} - b_U((L^{-1}1)^T L^{-1}\Delta_{\rho-r} + (L^{-1}\Delta_{\rho-r})^T L^{-1}1) + b_U^2((L^{-1}1)^T L^{-1}1) \qquad \text{Eq. 17}$$

M is defined as:

$$M = (L^{-1})^T L^{-1} = (LL^T)^{-1} \qquad \text{Eq. 18}$$

It follows that:

$$\delta_U^T \delta_U = (\Delta_{\rho-r}^T M \Delta_{\rho-r}) - 2(1^T M \Delta_{\rho-r})b_U + 1^T M 1 b_U^2 \qquad \text{Eq. 19}$$

The minimum value of $\delta^T\delta$ (instead of $\sqrt{\delta^T\delta}$) is found by differentiating it by $b_U$ and equating to 0:

$$\frac{\partial(\delta_U^T \delta_U)}{\partial b_U} = 2(1^T M 1)b_U - 2(1^T M \Delta_{\rho-r}) = 0 \qquad \text{Eq. 20}$$

From Eq. 20 it follows:

$$b_U^{min} = \frac{1^T M \Delta_{\rho-r}}{1^T M 1} \qquad \text{Eq. 21}$$

and $$\delta_U^{min} = L^{-1}(\Delta_{\rho-r} - b_U^{min} 1) \qquad \text{Eq. 22}$$

and $$x_U^{min} = x_B + \delta_U^{min} \qquad \text{Eq. 23}$$

Equation 23 represents the minimum distance to the solution line $\delta_U^{min}$ and point on the line $x_n$ closest to base position $x_B$.

Finding the Intersection of a Solution Line with a Plane (Solution of 2D Fix Problem)

Starting with the plane equation in Hessian form:

$$(x_U - x_B) \cdot n_{Pl} = \delta_U n_{Pl} = -D_{Plane} \qquad \text{Eq. 24}$$

where $n_{Pl}$ is the normal to the plane vector, and $D_B$ is the distance from the base position to the plane.
In the Cartesian system the equation will look like $$\delta_{U,x}n_x+\delta_{U,y}n_y+\delta_{U,z}n_z=-D_{Plane} \quad \text{Eq. 25}$$

Equation 8 can be rewritten in the form:

$$\delta_{U,x}l_{B,ix}+\delta_{U,y}l_{B,iy}+\delta_{U,z}l_{B,iz}+b_U=\Delta_{\rho-r,i} \; i=1,2,3 \quad \text{Eq. 26}$$

Equations 25 and 26 can be written in the matrix form:

$$\Lambda v = \theta \quad \text{Eq. 27}$$

where $$\Lambda = \begin{pmatrix} l_{B,1x} & l_{B,1y} & l_{B,1z} & 1 \\ l_{B,2x} & l_{B,2y} & l_{B,2z} & 1 \\ l_{B,3x} & l_{B,3y} & l_{B,3z} & 1 \\ n_x & n_y & n_z & 0 \end{pmatrix} \quad \text{Eq. 28}$$

$$v = \begin{pmatrix} \delta_{U,x} \\ \delta_{U,y} \\ \delta_{U,z} \\ b_U \end{pmatrix}$$

$$\theta = \begin{pmatrix} \Delta_{\rho-r,1} \\ \Delta_{\rho-r,2} \\ \Delta_{\rho-r,3} \\ -D_{Plane} \end{pmatrix}$$

Solving the equation results in:

$$v=\Lambda^{-1}\theta \quad \text{Eq. 29}$$

Note 1. In the case of the locally horizontal plane $n_x=n_y=0$; $\delta_z=-D_{plane}$
Introducing:

$$\Omega = \begin{pmatrix} l_{1x,B} & l_{1y,B} & 1 \\ l_{2x,B} & l_{2y,B} & 1 \\ l_{3x,B} & l_{3y,B} & 1 \end{pmatrix} \quad \text{Eq. 30}$$

$$\mu = \begin{pmatrix} \delta_{U,x} \\ \delta_{U,y} \\ b_U \end{pmatrix}$$

$$\varphi = \begin{pmatrix} \Delta_{\rho-r,1} + D_{plane} \\ \Delta_{\rho-r,2} + D_{plane} \\ \Delta_{\rho-r,3} + D_{plane} \end{pmatrix}$$

this can be written $$\Omega=\mu\phi \quad \text{Eq. 31}$$

and solved thus $$\mu=\Omega^{-1}\phi \quad \text{Eq. 32}$$

Intersection of a Solution Line with a Sphere Centered in a Base Location
The geofence sphere equation with the centre in base location $x_B$ can be written as:

$$\delta_x^2+\delta_y^2+\delta_z^2=\delta^T\delta=R_{geof}^2 \quad \text{Eq. 33}$$

Substituting $\delta_U^T\delta_U$ from Eq. 17 to Eq. 33:

$$\Delta_{\rho-r}^T M \Delta_{\rho-r}-2(1^T M \Delta_{\rho-r})b_U+(1^T M 1)b_U^2=R_{sph}^2 \quad \text{Eq. 34}$$

or $$(1^T M 1)b_U^2-2(1^T M \Delta_{\rho-r})b_U+(\Delta_{\rho-r}^T M \Delta_{\rho-r}-R_{sph}^2)=0 \quad \text{Eq. 35}$$

The roots of this quadratic equation are:

$$b_{U1,2}^{sph} = \frac{1^T M \Delta_{\rho-r} \pm \sqrt{(1^T M \Delta_{\rho-r})^2 - (1^T M 1)(\Delta_{\rho-r}^T M \Delta_{\rho-r} - R_{sph}^2)}}{1^T M 1} \quad \text{Eq. 36}$$

When the expression under square root in Eq. 36 is 0, Eq. 36 becomes Eq. 21. The vectors from the base location to the intersection points with the geofence sphere can be expressed as $$\delta_{1,2}^{sph}=L^{-1}\Delta_{\rho-r}-b_{U1,2}^{sph}L^{-1}1 \quad \text{Eq. 37}$$

and intersection points are $$x_{1,2}^{sph}=x_B+\delta_{1,2}^{sph} \quad \text{Eq. 38}$$

Intersection of a Solution Line with a Geofence Cylinder
The geofence cylinder's equation in the coordinate system, with the centre in $x_B$ and the xy plane being a locally horizontal plane, can be written as $$\delta_x^2+\delta_y^2=R_{cyl}^2 \quad \text{Eq. 39}$$

The xy projection of three dimensional vector $\delta_U$ (Eq. 11)

$$(\delta_U)_{xy} = \begin{pmatrix} \delta_{U,x} \\ \delta_{U,y} \end{pmatrix} \quad \text{Eq. 40}$$

A partial inverse line of sight matrix $$(L^{-1})_{xy} = \begin{pmatrix} \hat{l}_{x1} & \hat{l}_{x2} & \hat{l}_{x3} \\ \hat{l}_{y1} & \hat{l}_{y2} & \hat{l}_{y3} \end{pmatrix} \quad \text{Eq. 41}$$

where $\hat{l}_{kj}$ is the k-th row and j-th column element of the $L^{-1}$ matrix. Eq. 14 can be used to express $(\delta_U)_{xy}$ $$(\delta_U)_{xy}=(L^{-1})_{xy}\Delta_{\rho-r}-b_U(L^{-1})_{xy}1 \quad \text{Eq. 42}$$

The geofence cylinder equation Eq. 39 can be rewritten as:

$$(\delta_U)_{xy}^T(\delta_U)_{xy}=R_{cyl}^2 \quad \text{Eq. 43}$$

Note that Eq. 43 is identical to Eq. 33. This the conclusion follows that:

$$b_{U1,2}^{cyl} = \frac{1^T M_{xy} \Delta_{\rho-r} \pm \sqrt{(1^T M_{xy} \Delta_{\rho-r})^2 - (1^T M_{xy} 1)(\Delta_{\rho-r}^T M_{xy} \Delta_{\rho-r} - R_{cyl}^2)}}{1^T M_{xy} 1} \quad \text{Eq. 44}$$

where $$M_{xy} = (L^{-1})_{xy}^T (L^{-1})_{xy}$$

Using Eq. 17 displacement vectors from the base location to the intersection points with the geofence cylinder $\delta_1^{cyl}$, $\delta_2^{cyl}$ can be expressed as:

$$\delta_{U1,2}^{cyl}=L^{-1}\Delta_{\rho-r}-b_{U1,2}^{cyl}L^{-1}1 \quad \text{Eq. 45}$$

and intersection points are:

$$x_{U1,2}^{cyl}=x_B+\delta_{U1,2}^{cyl} \quad \text{Eq. 46}$$

Geofence Algorithms

Geofence algorithms for various geofence volumes and exclusion spaces are presented below. For simplicity, the user frame coordinate system with the centre in $x_B$ is assumed.

In each case, before using the solution line, one should check for the solution line's DOP and discontinue computation if the DOP is too high, greater than 7-10.

Geofence Sphere

Figure 6:
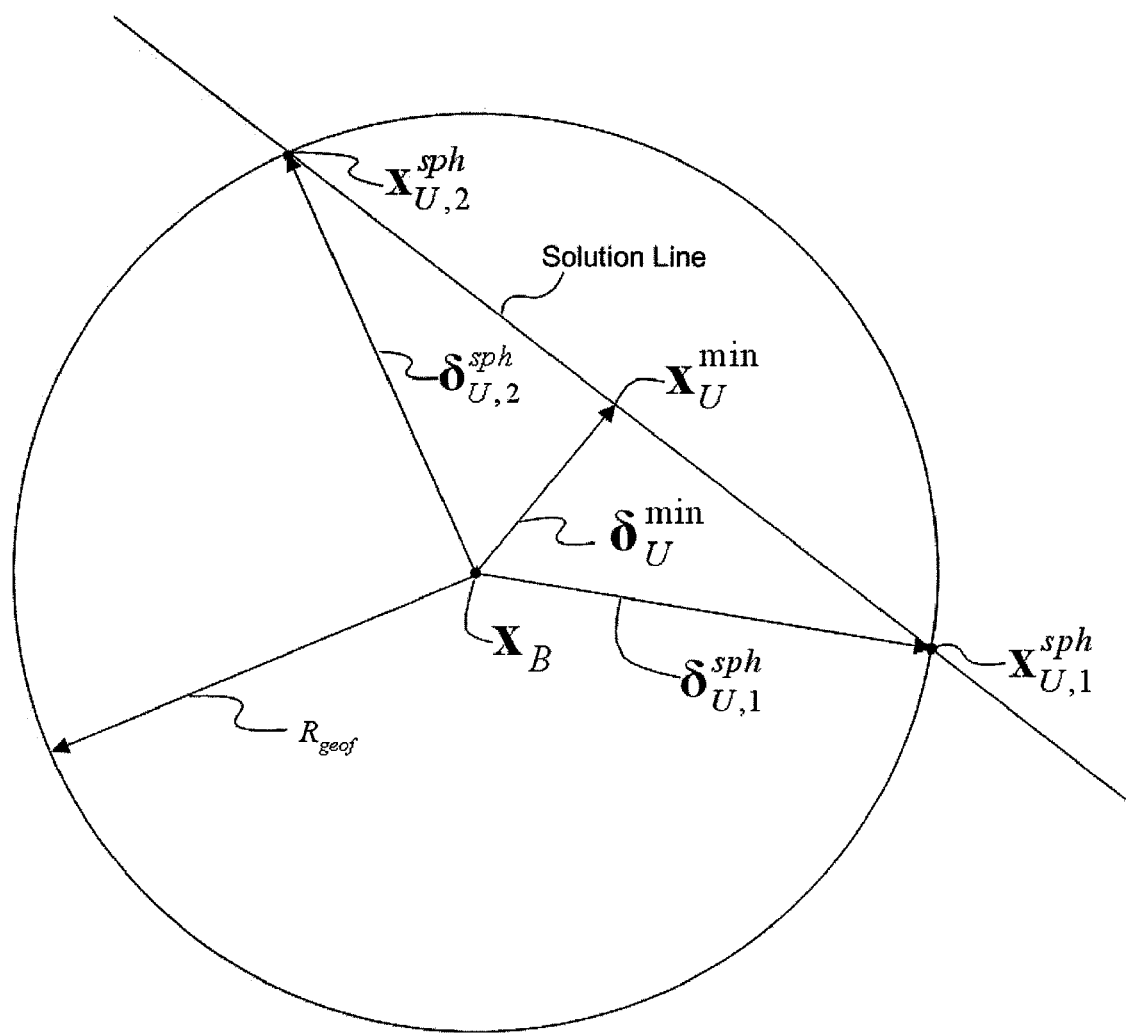
FIG. 6 is a diagram of parameters used in a geofence sphere algorithm to determine whether any part of a solution line is within a geofence sphere.

An exemplary algorithm for determining whether a solution line is inside or outside a geofence sphere is as follows. The algorithm's parameters are illustrated in FIG. 6.

1. Compute $\delta_U^{min} = |\delta_U^{min}|$
2. If $\delta_U^{min} > R_{geof}$, declare P(Alarm)=1, end.
3. Declare 0<P(Alarm)<1, end.

Geofence Sphere with Upper and Lower Exclusion Spaces

Figure 7:
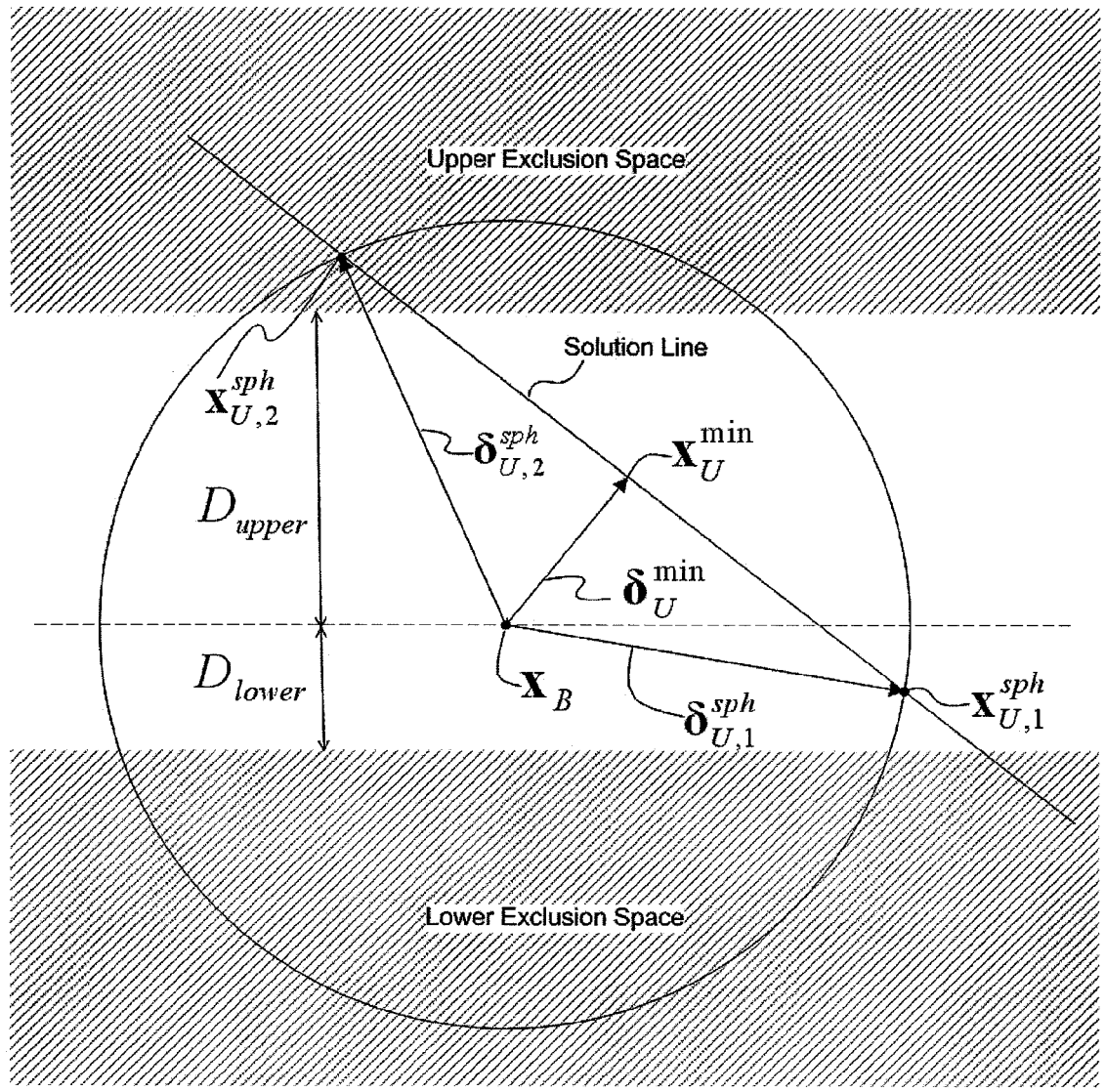
FIG. 7 is a diagram of parameters used in a geofence sphere algorithm to determine whether any part of a solution line is within a geofence sphere where the sphere is bounded by exclusion spaces.

An exemplary algorithm for determining whether a solution line is inside or outside a geofence sphere, where the sphere is bounded by exclusion spaces is as follows. The algorithm's parameters are illustrated in FIG. 7.

1. Compute $\delta_U^{min} = |\delta_U^{min}|$
2. If $\delta_U^{min} > R_{geof}$, declare P(Alarm)=1, end.
3. Find vectors $\delta_{U,1}^{sph}$ and $\delta_{U,2}^{sph}$ pointing to the intersections of the solution line with the geofence sphere. Assuming, $\delta_{U,1z}^{sph} < \delta_{U,2z}^{sph}$, if $\delta_{U,1z}^{sph} < -D_{lower}$ and $\delta_{U,2z}^{sph} > D_{upper}$, declare P(Alarm)=0, end.
4. If the result of step 3 is not that P(Alarm)=0, then Declare 0<P(Alarm)<1, end.

Geofence Cylinder

Figure 8:
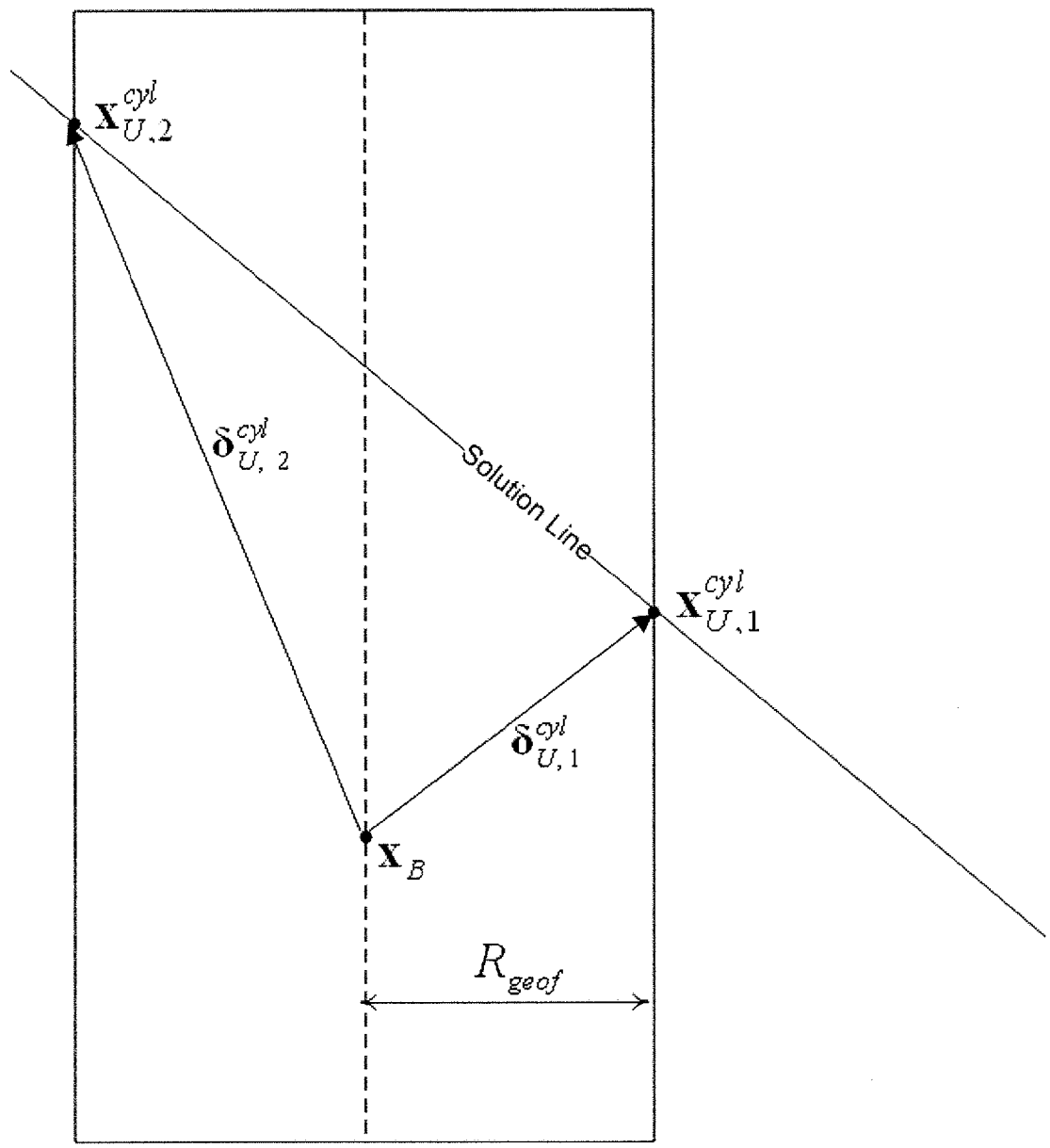
FIG. 8 is a diagram of parameters used in a geofence cylinder algorithm to determine whether any part of a solution line is within a geofence cylinder.

An exemplary algorithm for determining whether a solution line is inside or outside a geofence cylinder is as follows. The algorithm's parameters are illustrated in FIG. 8.

1. Compute expression taken from the expression under the square root in Eq. 44:

$$D_{quadr} = (1^T M_{xy} \Delta_{\rho-r})^2 - (1^T M_{xy} 1)(\Delta_{\rho-r}^T M_{xy} \Delta_{\rho-r} - R_{cyl}^2) \quad \text{Eq. 47}$$

If $D_{quadr} < 0$ (No real roots in Eq. 44), declare P(Alarm)=1, end.

2. Declare 0<P(Alarm)<1, end.

Geofence Cylinder with Upper and Lower Exclusion Spaces

Figure 9:
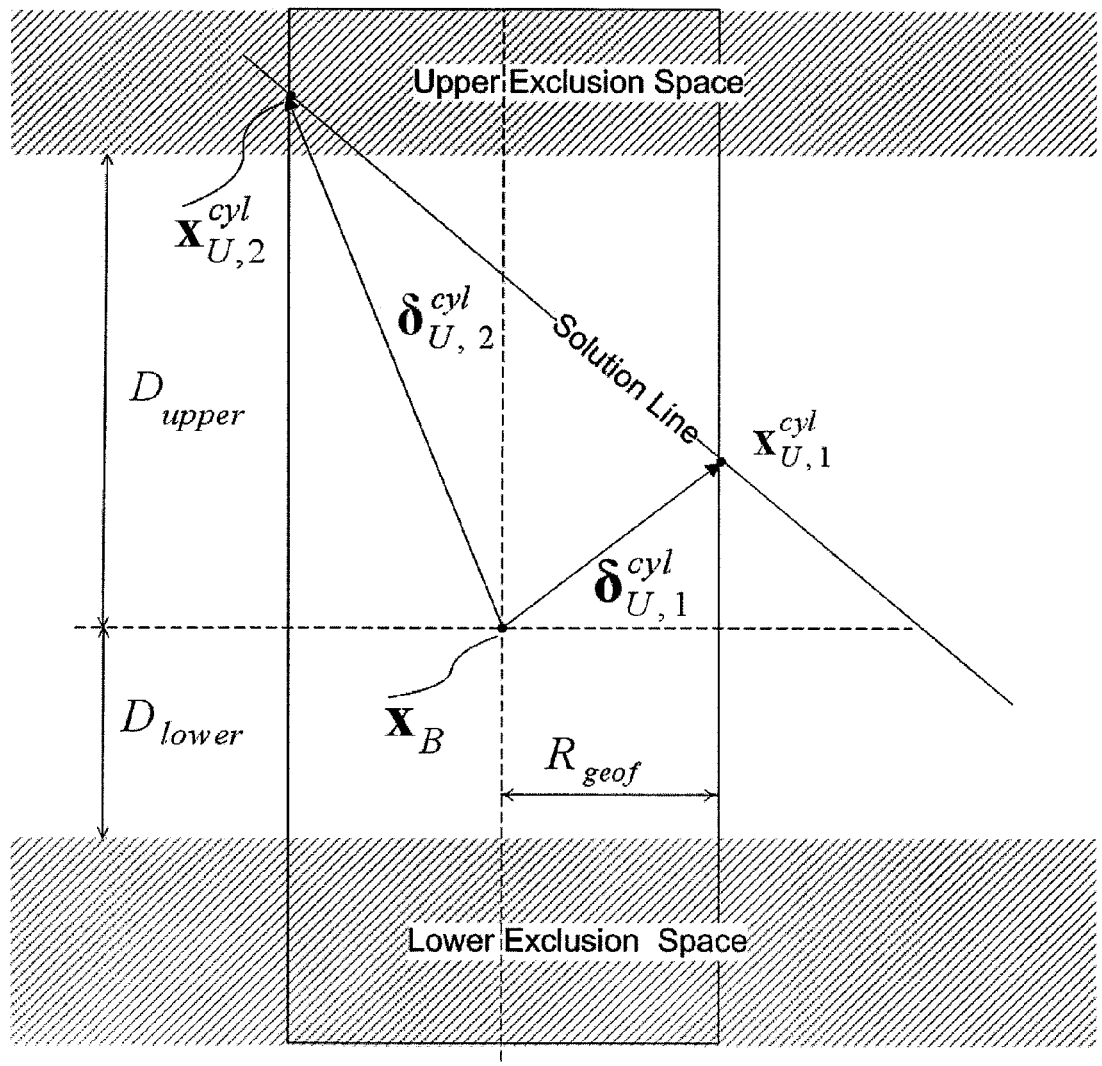
FIG. 9 is a diagram of parameters used in a geofence cylinder algorithm to determine whether any part of a solution line is within a geofence cylinder where the cylinder is bounded by exclusion spaces.

An exemplary algorithm for determining whether a solution line is inside or outside a geofence cylinder is as follows. The algorithm's parameters are illustrated in FIG. 9.

1. Compute expression taken from the expression under the square root in Eq. 44:

$$D_{quadr} = (1^T M_{xy} \Delta_{\rho-r})^2 - (1^T M_{xy} 1)(\Delta_{\rho-r}^T M_{xy} \Delta_{\rho-r} - R_{cyl}^2)$$

2. Compute vectors $\delta_1^{cyl}$ and $\delta_2^{cyl}$ from Eq. 45. Assuming $\delta_{U,2z}^{cyl} > \delta_{U,1z}^{cyl}$, if $\delta_{U,2z}^{cyl} > D_{upper}$ and $\delta_{U,1z}^{cyl} < -D_{lower}$ (both intersections with the cylinder occur in the exclusion spaces), declare P(Alarm)=0, end.
3. Declare 0<P(Alarm)<1, end.

Geofence Cylinder with Exclusion Spaces, 2D Fix Method.

Figure 10:
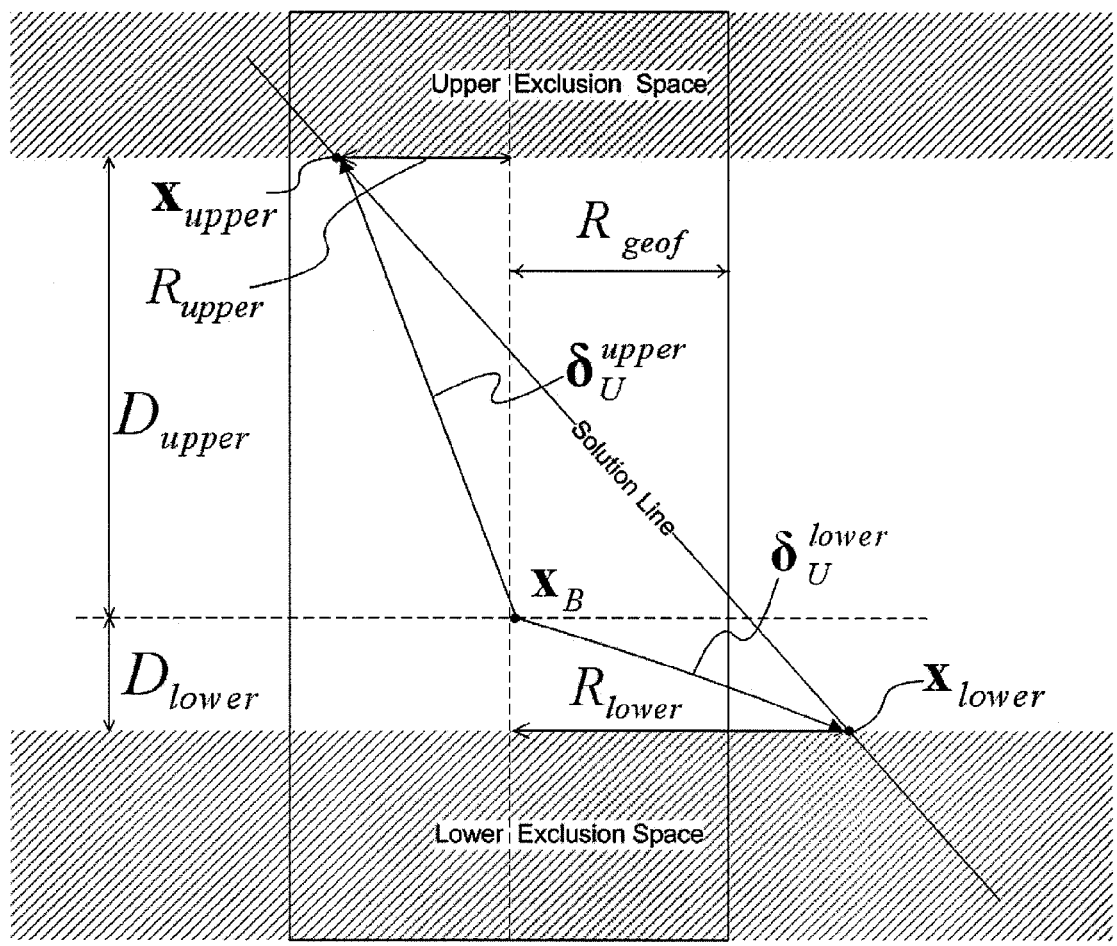
FIG. 10 is a diagram of parameters used in a 2D fix geofence algorithm to determine whether any part of a solution line is within a geofence cylinder where the cylinder is bounded by exclusion spaces.

This exemplary algorithm produces the same results as the immediately previous algorithm but computes different parameters. The parameters used in the algorithm are illustrated in FIG. 10.

1. Compute 2D fixes at altitudes $x_{B,z} + D_{upper}$ and $x_{B,z} + D_{lower}$.
2. Projecting the found points on a horizontal plane, find the distance between the 2D line passing through points $(x_{upper}, y_{upper})$, $(x_{lower}, y_{lower})$ and the $x_B$ projection $(x_{base}, y_{base})$. The distance is given by the formula $$R = \frac{|(x_{upper} - x_{lower})y_{lower} - x_{lower}(y_{upper} - y_{lower})|}{\sqrt{(x_{upper} - x_{lower})^2 + (y_{upper} - y_{lower})^2}} \quad \text{Eq. 48}$$

If $R \geq R_{geof}$, declare P(Alarm)=1, end.
3. If $R_{upper} < R_{geof}$ and $R_{lower} < R_{geof}$, declare P(Alarm)=0, end.
4. Declare 0<P(Alarm)<1, end.

Generalized Geofencing Method

Figure 11:
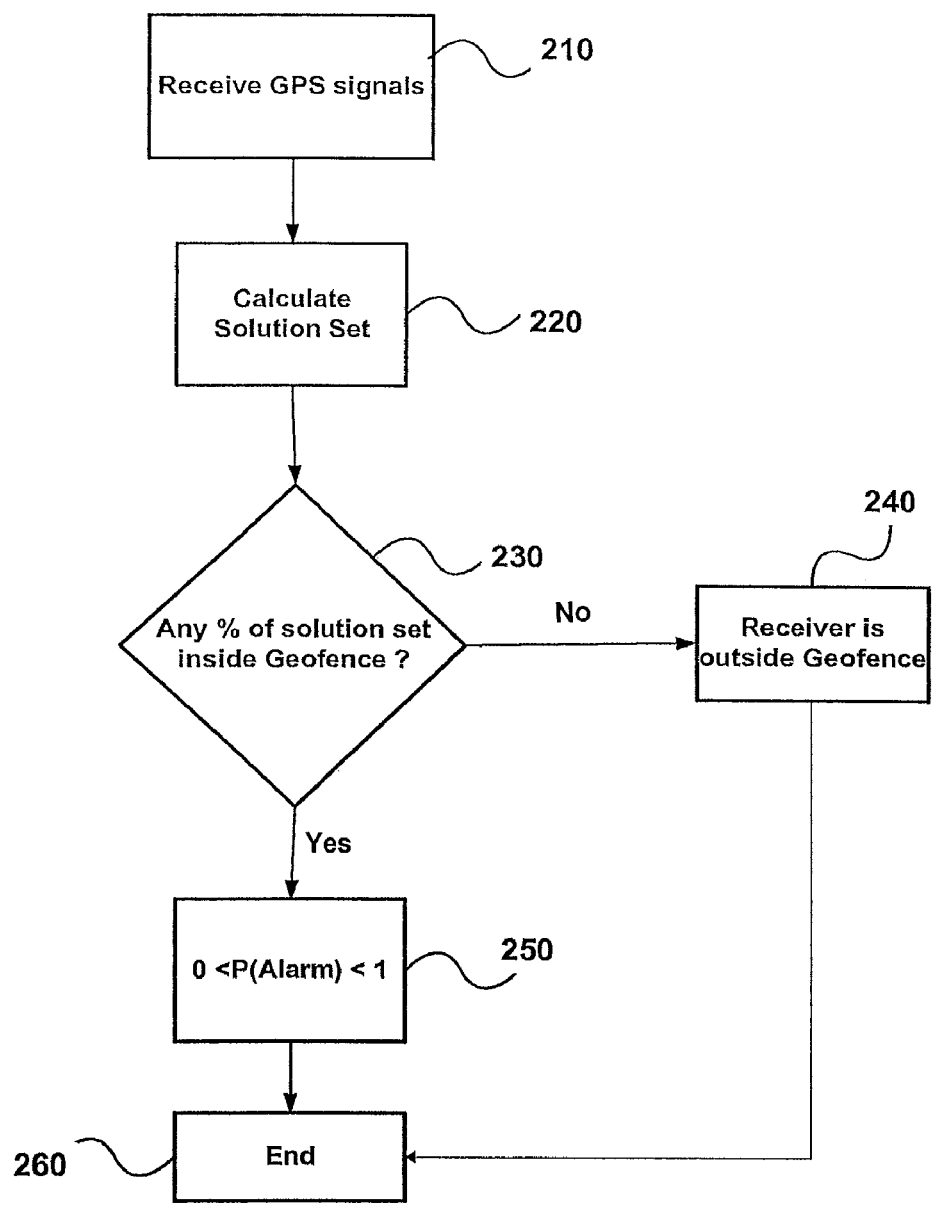
FIG. 11 is a flow diagram of an exemplary method for determining whether a GPS receiver is located within a predetermined geofence volume.

A generalized exemplary method for determining whether a GPS receiver is located within a geofence volume is illustrated in FIG. 11. The foregoing algorithms are exemplary way of determining of whether portions of a solution line are within the geofence volume, where the volume is a sphere or a cylinder, as discussed below in step 230.

At step 210 global positioning system signals are received from a plurality of GPS satellites;

At step 220, a solution set of possible receiver positions is calculated from the global positioning signals received in step 210;

At decision point 230, it is determined whether any portion of the solution set is within the geofence volume; and If at step 230 it is determined that no portion of the solution set is inside the geofence volume, then at step 240 it is determined that the receiver is outside the geofence volume and P(Alarm)=1.

If at step 230 it is determined that some portion of the solution set is inside the geofence volume, then it can not be determined that the receiver is inside or outside the geofence volume and at step 250, 0<P(Alarm)<1.

The method is complete and ends at step 260 after either step 240 or 250.

Three Satellite Geofencing Method with Modeled Exclusion Space Boundaries

As in the generalized method, GPS signals are received and a solution set of possible receiver positions is calculated. For a three satellite case, the solution set is a line.

Figure 12:
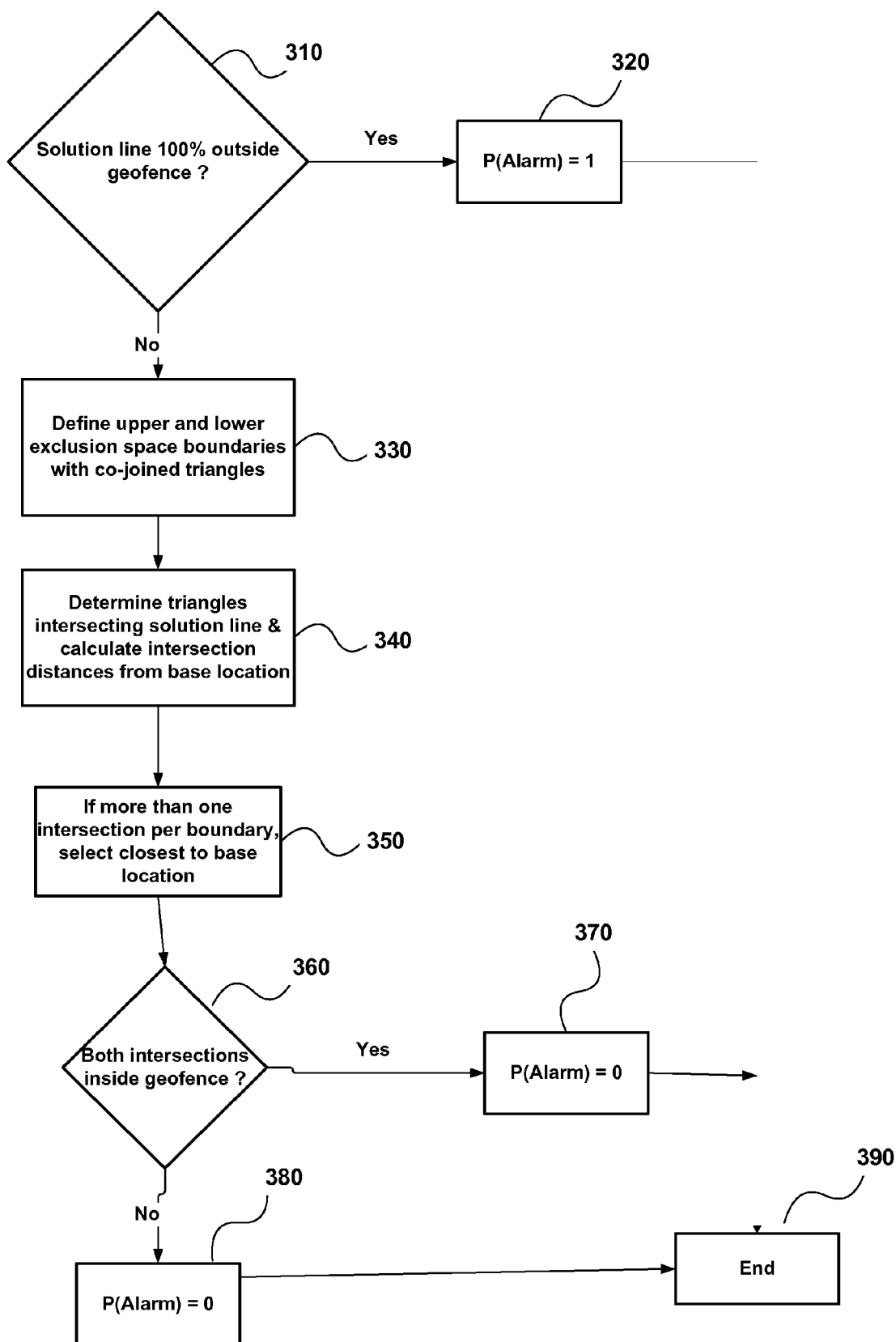
FIG. 12 is a flow diagram of an exemplary method for determining whether a GPS receiver is located within a predetermined geofence volume.

Referring to FIG. 12, at decision point 310, a determination is made whether 100% of the solution line is outside of the geofence. If it is, at step 320, P(Alarm)=1 and the method steps end at step 390.

If some portion of the solution line is inside the geofence, then at step 330, upper and lower exclusion spaces are defined with co-joined triangles, for example, in a triangulated irregular network. At step 340 the triangles that intersect the solution line are determined. If the solution line intersects more than one triangle in an exclusion space boundary, then the point of intersection closest to the base location is chosen. At decision point 360, it is determined whether the intersections of the solution line with the upper and lower exclusion space boundaries are both within the geofence volume. If they are, at step 370, P(Alarm) is set to 0, meaning that the receiver must be within the geofence. If either of the intersection points is outside the geofence, then at step 380, 0<P(Alarm)<1. On each case, the method steps end at step 390. In the case where 0<P(Alarm)<1, P(Alarm) can be estimated, as described above, by determining the portion of the solution set outside the geofence and inside the exclusion spaces versus the total portion of the solution set inside the exclusion spaces.

While the invention has been described in detail and with reference to specific examples thereof, it will be apparent to one skilled in the art that various changes and modifications can be made therein without departing from the spirit and scope thereof.

What is claimed is:

1. A method for determining that a GPS receiver is located within a predetermined geofence volume, comprising:
    receiving global positioning system signals from a plurality of GPS satellites;
    calculating a solution set of possible receiver positions from said global positioning signals;
    determining whether any portion of said solution set is within the geofence volume; and
    determining that the receiver is outside the geofence volume if no portion of said solution set of receiver positions is within the geofence volume; and
    wherein said plurality of satellites is selected from the group consisting of: two satellites wherein said solution set is a solution plane; and three satellites wherein said solution set is a solution line.

2. The method of claim 1, wherein said plurality of GPS satellites consists of two satellites.

3. The method of claim 1, wherein said plurality of GPS satellites consists of three satellites.

4. The method of claim 3, further comprising:
    establishing an upper and lower exclusion space, defined to be spaces with generally horizontal border surfaces where there is a high probability that the receiver cannot be located; defining an upper border surface for said upper exclusion space and a lower border surface for said lower border surface, said border surfaces being modeled with triangular elements;
    determining triangular elements having intersection points with said solution line;
    if more than one triangular element defining a border surface has an intersection point with said solution line, selecting the intersection point closest to a base position located within the geofence volume; otherwise selecting the single intersection point for each border surface, to establish an upper and lower exclusion space intersection point;
    establishing an alarm probability of zero if both of said intersection points are within the geofence volume.

5. The method of claim 4, further comprising:
    where one or both of said intersection points is outside of the geofence volume, such that portions of said solution set are within the geofence volume and portions are within said exclusion spaces but not within the geofence volume, and portions are not in the geofence volume or said exclusion spaces, calculating a probability that the receiver is within the geofence volume by comparing the size of the portion of said solution set that is within the geofence volume with the size of the portion of said solution set that is not within either said exclusion spaces or said geofence volume.

6. The method of claim 3, wherein the geofence volume is a sphere, and wherein said determining whether any portion of said solution set is within the geofence volume comprises calculating the minimum distance from the center of said sphere to said solution line and determining that no portion of said solution set is within the geofence volume if said minimum distance from the center of said sphere to said solution line is greater than the radius of said sphere.

7. The method of claim 1, further comprising:
    establishing a plurality of exclusion spaces defined to be spaces where there is a high probability that the receiver cannot be located; and
    determining that the receiver is within the geofence volume if a portion of said solution set is within the geofence volume and the only portion of said solution set that is not within the geofence volume is completely within one or more of said plurality of exclusion spaces.

8. The method of claim 7, wherein the geofence is a sphere having a radius $R_{geof}$ and further comprising Computing $\delta_U^{min} = |\delta_U^{min}|$
    Determining if $\delta_U^{min} > R_{geof}$ and if so, declaring P(Alarm)=1, and ending the method steps;
    If P(Alarm) does not equal 1, finding vectors $\delta_{U,1}^{sph}$ and $\delta_{U,2}^{sph}$ pointing to the intersections of the solution line with the geofence sphere such that $\delta_{U,1z}^{sph} < \delta_{U,2z}^{sph}$;
    if $\delta_{U,1z}^{sph} < -D_{lower}$ and $\delta_{U,2z}^{sph} > -D_{upper}$ declaring P(Alarm)=0;
    if P(Alarm) does not equal 0, declaring 0<P(Alarm)<1.

9. The method of claim 8, wherein a portion of said solution line is within said sphere and a larger portion of said solution line is not in said exclusion spaces, further comprising determining a value for P(Alarm) in the case where 0<P(Alarm)<1, by calculating the portion of said solution line within said sphere over the portion of said solution line not within said exclusion spaces.

10. The method of claim 1, further comprising:
    establishing a plurality of exclusion spaces, defined to be spaces where there is a high probability that the receiver cannot be located;
    where portions of said solution set are within the geofence volume and portions are within said exclusion space but not within the geofence volume, and portions are not in the geofence volume or said exclusion space, calculating a probability that the receiver is within the geofence volume by comparing the size of the portion of said solution set that is within the geofence volume with the size of the portion of said solution set that is not within either said exclusion spaces or said geofence volume.

11. An article of manufacture for enabling a global positioning system to determine where a global positioning receiver is within a predetermined geofence volume, the article of manufacture comprising:
    a computer-readable storage medium; and
    code stored in said computer-readable storage medium, such that when said code is executed in a processor in said global positioning receiver, said processor causes said receiver to receiving global positioning system signals from a plurality of GPS satellites;
    calculates a solution set of possible receiver positions from said global positioning signals;
    determines whether any portion of said solution set is within the geofence volume; and
    determines that the receiver is outside the geofence volume if no portion of said solution set of receiver positions is within the geofence volume; and
    wherein said plurality of satellites is selected from the group consisting of: two satellites wherein said solution set is a solution plane; and three satellites wherein said solution set is a solution line.

12. A method for determining the probability, P(Alarm), that a GPS receiver is outside of a predetermined geofence volume wherein the geofence volume is bounded by a plurality of exclusion spaces, the method comprising:
    receiving global positioning system signals from a plurality of GPS satellites;
    calculating a solution set of possible receiver positions from said global positioning signals;
    determining whether any portion of said solution set is within the geofence volume; and
    determining that P(Alarm)=1 if no portion of said solution set of receiver positions is within the geofence volume;

determining that P(Alarm)=0 if a portion of said solution set of receiver positions is within the geofence volume and no portion of said solution set of receiver positions is outside of the geofence volume and not inside any of said exclusion spaces; and determining that if a portion of said solution set is not within the exclusion spaces or the geofence volume, then P(Alarm) equals the portion of said solution set of receiver positions within the geofence volume divided by the portion of said receiver positions that is not within the exclusion spaces.

\* \* \* \* \*